Figure 1:
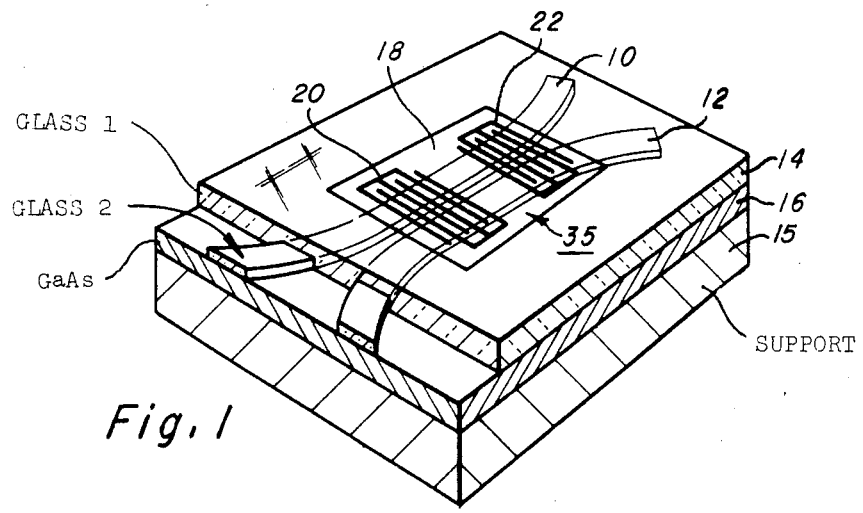

United States Patent
Riseberg et al.

[11] 3,850,503
[45] Nov. 26, 1974

[54] ASYMMETRIC WAVEGUIDE PAIR ACOUSTIC SURFACE WAVE SWITCH

[75] Inventors: Leslie Allen Riseberg, Sudbury, Mass.; Warner Curtis Scott, Dallas, Tex.

[73] Assignee: Texas Instruments Incorporated, Dallas, Tex.

[22] Filed: Oct. 26, 1972

[21] Appl. No.: 300,953

[52] U.S. Cl. ........... 350/96 WG, 350/96 C, 350/161
[51] Int. Cl. ............................................. G02b 5/14
[58] Field of Search ...................... 350/96 WG, 161

[56] References Cited
UNITED STATES PATENTS

| | | | |
|---|---|---|---|
| 3,351,410 | 11/1967 | Ashkin | 350/96 WG X |
| 3,589,794 | 6/1971 | Marcatili | 350/96 WG |
| 3,655,261 | 4/1972 | Chang | 350/96 WG |

*Primary Examiner*—John K. Corbin
*Attorney, Agent, or Firm*—Harold Levine; James T. Comfort; William E. Hiller

[57] ABSTRACT

An acousto-optically coupled asymmetric waveguide pair and method of operation is disclosed. A pair of dielectric optic waveguides are defined in close proximity. Each waveguide is characterized by a propagation constant at which it can support propagation of a signal. An acoustic surface wave is effective to vary the propagation constant of the waveguides such that the signal is switched from one waveguide to the other.

8 Claims, 16 Drawing Figures

'A' Mode

'B' Mode

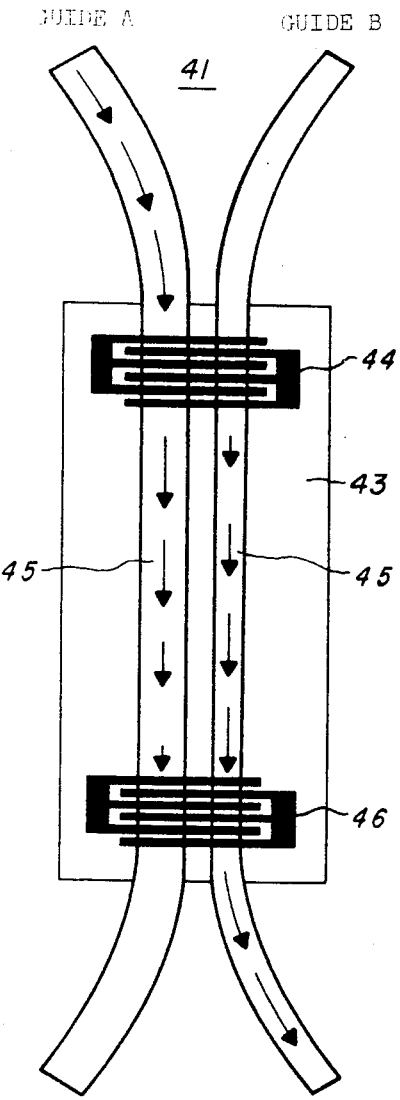
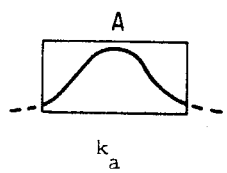
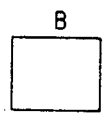
Fig. 5A
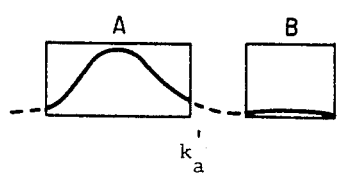
Fig. 5B
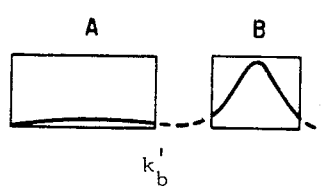
Fig. 5C
Fig. 4
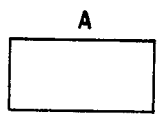
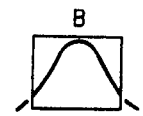
Fig. 5D

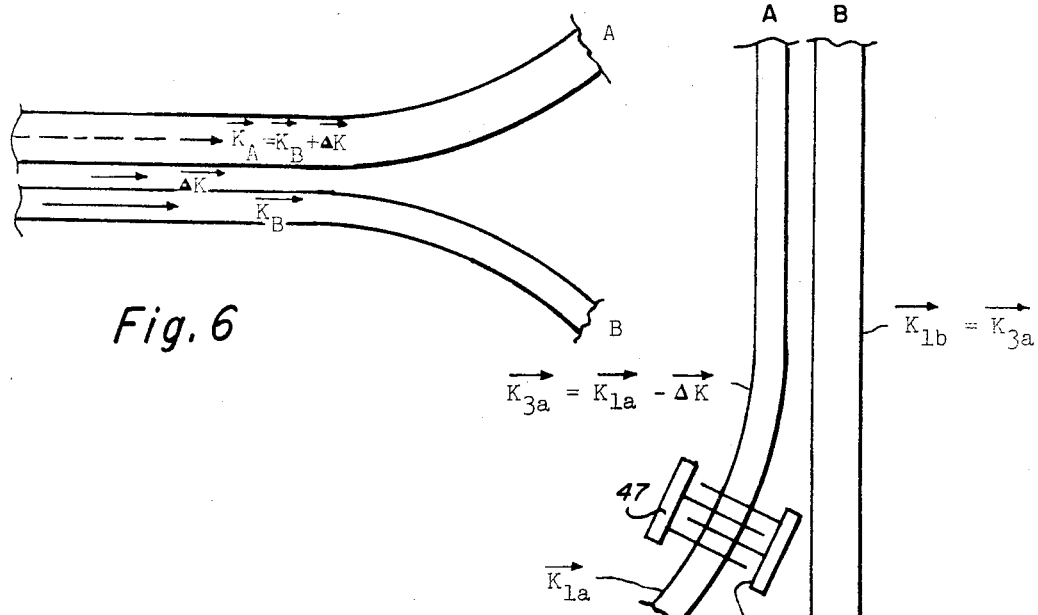
Fig. 6
Fig. 7
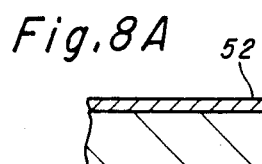
Fig. 8A
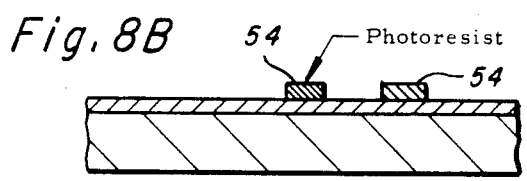
Fig. 8B
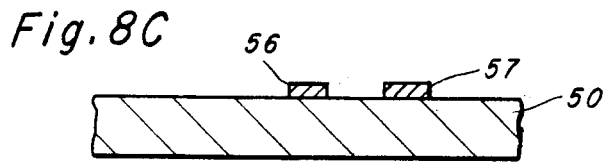
Fig. 8C
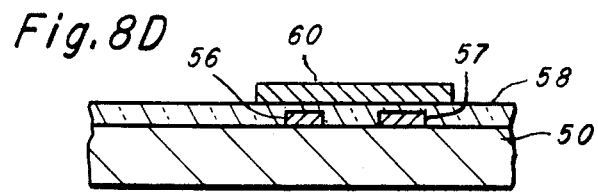
Fig. 8D

ASYMMETRIC WAVEGUIDE PAIR ACOUSTIC SURFACE WAVE SWITCH

The present invention pertains to optical data processing systems in general, and more particularly to such systems which include asymmetric thin-film optical waveguide pair switches wherein switching is effected by interaction of optical waves and acoustic waves.

As a result of the development of improved optical sources and associated devices, optical data processing systems have become more feasible. To fully realize the advantages of such systems, however, miniaturization of the components and integration of the separate functions must be provided. A notable step toward achieving an integrated optics system involves the fabrication of thin film optical components for the performance of discrete functions. In the area of passive devices, optical waveguides have been fabricated in thin film geometries by the use of evaporated thin crystalline films, sputtered glass films, and plasma-deposited organosilicon films. Measurements have indicated that the sputtered and plasma-deposited films have losses sufficiently low to permit essentially lossless propagation over the distances imposed by requirements of the components.

In the area of active component development, deflectors, modulators, and mode converters have been made involving the interaction of an optical beam in a thin film with an acoustic surface wave. By way of example, Kuhn et al. "Optical Guided Wave Mode Conversion by an Acoustic Surface Wave," Applied Physics Letters, Vol. 19, No. 10, Nov. 15, 1971, describe Bragg deflection of optical guided waves in thin films wherein a thin-film optical guided wave is diffracted from one mode to another by a surface acoustic wave. As described therein, the mode conversion, a co-linear parametric interaction between two optical guided waves and a surface acoustic wave, satisfies the usual non-linear phase-matching conditions. The coupling mechanism is the photoelastic effect in the optical waveguide.

To date, however, it has not been possible to switch an optical wave from one waveguide or channel to another, as is required in many integrated optics applications.

Accordingly, an object of the present invention is the provision of a switch for switching from one optical waveguide to another.

An additional object of the invention is the provision of an asymmetric waveguide pair switch.

Another object of the invention is an asymmetric waveguide pair switch wherein a signal is switched from one waveguide to a second waveguide responsive to an acoustic surface wave.

Briefly in accordance with the invention methods and apparatus are provided for switching a signal from one dielectric optical waveguide to another. More particularly, an asymmetric waveguide pair switch includes two assymmetric dielectric waveguides. Each waveguide has a preselected propagation constant at which it can support propagation of a signal. The waveguides are spaced far apart except at the location where switching occurs, at which point the waveguides are in close proximity — generally spaced apart by a distance of the same order of magnitude as the width of the waveguides. Means are provided for varying the propagation constant of the signal carrying waveguide to a value which will not support signal propagation. The means also are effective to change the propagation constant of the other waveguide to a value which will support signal propagation. Thus, the signal is coupled from one guide to the other.

In a preferred embodiment the means for varying the propagation constant of the waveguides comprises interaction of an acoustic surface wave with the waveguides. The acoustic wave is generated by defining interdigital transducers on a piezoelectric film which is deposited over the region where the waveguides are closely spaced.

A method for switching a signal from one waveguide to another is also provided in accordance with the invention. The method includes the steps of generating an acoustic surface wave, and interacting the acoustic surface wave with the optical waveguides to effectively vary the propagation constants thereof to effect switching of the signal.

Figure 2A:
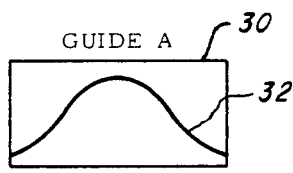
Figure 2B:
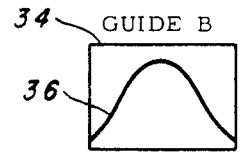
Figure 3A:
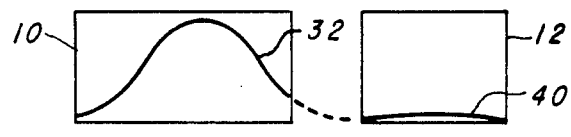
Figure 3B:

Other objects and advantages will be apparent upon reading the following detailed description of illustrative embodiments in conjunction with the drawings wherein:

FIG. 1 is a perspective view in partial cross-section of an assymmetric waveguide pair switch in accordance with the invention;

FIGS. 2A and 2B graphically illustrate the field distribution of the fundamental mode of propagation of optical waveguides suitable for use in the switch of FIG. 1;

FIGS. 3A and 3B graphically illustrate interaction between two closely spaced dielectric optical waveguides with a signal propagating in only one;

FIG. 4 is a plan view diagrammatically illustrating operation of the asymmetric waveguide pair switch in accordance with the invention;

FIGS. 5A–5D graphically depict the field distribution of the waveguides illustrated in FIG. 4 showing operation of the switch;

FIG. 6 diagrammatically illustrates switching action of the asymmetric waveguide pair responsive to an acoustic surface wave;

FIG. 7 schematically illustrates an alternate embodiment of a waveguide pair switch; and FIGS. 8A–8D are cross-sectional views illustrating fabrication of the asymmetric waveguide pair in accordance with the invention.

With reference now to the drawings, and for the present, to FIG. 1, an asymmetric waveguide pair switch in accordance with the invention is illustrated. The switch includes two separate channels of waveguides 10 and 12. Preferably, the waveguides 10 and 12 are defined by a first dielectric medium embedded in a second dielectric 14 which has a lower refractive index than the dielectric used for the guides 10 and 12. The waveguide structures are formed on a suitable substrate 16. By way of example, a suitable substrate can be III-V semiconductor such as GaAs. The substrate is mechanically supported on a suitable support 15. Suitable dielectric materials include chalcogenide glass which can be RF sputtered on III-V substrates using conventional techniques. Appropriate refractive index differences may be provided by minor adjustments of the glass composition. Also, refractive index variations can be introduced using ion implantation and electron beam techniques.

As illustrated in FIG. 1, the separate waveguides 10 and 12 are separated by a distance larger than the order of magnitude of width of the respective waveguides except in the region where switching from one waveguide to the other is desired. In this region the two waveguides are closely spaced — generally by a distance of the same order of magnitude as the respective waveguide widths. In the closely spaced region a piezoelectric film 18 is deposited. By way of example, the film 18 may comprise zinc oxide. Other suitable piezoelectric films known in the art may be used.

Interdigital acoustic surface wave transducers 20 and 22 are defined on the piezoelectric film 18 to enable launching an acoustic surface wave in the region of the waveguide pair switch where guides 10 and 12 are closely spaced. As will be explained in detail hereinafter, the acoustic surface wave enables switching from one guide to the other. Interdigital surface wave transducers and method of fabrication are well-known in the art and need not be described in detail herein.

At this juncture a brief description of optical passive waveguide structures may be beneficial in better understanding the invention.

Electromagnetic waves at optical frequencies may be guided in dielectric slabs and waveguide structures where the refractive index of the structure is greater than that of the surrounding medium. Single mode propagation in the lowest order mode is possible for appropriate dimensions of the geometry so that high order modes are below cutoff for the frequency of interest. Considering a rectangular cross-section waveguide of index $n_2$ embedded in a medium of index $n_1$ with $n_2 > n_1$, the energy in the lowest order mode is almost entirely confined to the higher index region if $$n_1 = n_2 (1 - \Delta),$$

where $$\Delta \approx 3(\lambda_o/W)^2,$$

$\lambda_o$ = free space wavelength, and
$W$ = width of the $n_2$ region,
provided $2\lambda_o/Wn_2 \ll 1$. However, this permits several higher order modes to be propagated as well. All higher order modes will be below cutoff, permitting propagation in only the lowest order mode for $$W/\lambda_o (n_2^2 - n_1^2)^{1/2} \approx 0.8,$$

or approximately $$\sqrt{2}\, W/\lambda_o\, n_2\, \Delta^{1/2} \approx 0.8,$$

to prevent mode conversion and radiation loss at bends of the waveguide on the surface, the minimum bending radius must be greater than $R_{MIN}$, $$R_{MIN} \approx n_1^2\, W^3/4\, \lambda_o^2.$$

Several techniques for launching an optical wave in the film guide may be utilized. Prism couplers and surface gratings are both efficient means of coupling a laser beam into the guide.

With reference now to FIGS. 2A and 2B suitable waveguides for use in the asymmetric waveguide pair switch of FIG. 1 are illustrated. Waveguide 30 exhibits a propagation constant $k_a$; the field distribution corresponding to the fundamental mode of propagation of guide 30 is illustrated at 32. In FIG. 2B the other waveguide 34 of the asymmetric waveguide pair is illustrated. Waveguide 34 has a propagation constant $k_b$ which is different from $k_a$. The field distribution corresponding to the fundamental propagating mode of guide 34 is illustrated at 36.

With reference to the waveguide pair switch illustrated in FIG. 1, assume first that a wave having a field distribution 32 is propagating only in waveguide 10. In the region where guides 10 and 12 are closely spaced, referenced generally at 35 in FIG. 1, the guide 12 will have a slight influence on the field distribution of the wave propagating in guide 10. This is graphically illustrated in FIG. 3A, where interaction of the two closely spaced guides produces a slight perturbation 40 in guide 12. The interaction with guide 12 produces a new propagation constant for guide 10 in region 35 of $k_a'$. However, $k_a'$ is approximately equal to $k_a$. Subsequent to propagation of the wave 32 beyond the region 35 where the two guides are closely spaced, guide 10 again is characterized by a propagation constant of $k_a$ and the wave 32 continues to propagate unabated in guide 10, having experienced only a slight loss due to the interaction.

Similarly, for the situation where a wave having a field distribution 34 initially is propagated in guide 12, and no signal is present in guide 10, in the region 35 where guides 10 and 12 are closely spaced guide 12 will exhibit a propagation constant $k_b'$ which is approximately equal to $k_b$. This is illustrated graphically in FIG. 3B. As shown, only a small perturbation 42 is generated in guide 10 as a result of the wave 36 propagating in guide 12.

Operation of the acousto-optically coupled asymmetric waveguide pair in accordance with the invention will now be described with reference to FIGS. 4–6. Two asymmetric waveguides A and B are initially spaced apart a substantial distance, such as illustrated in the region 41. By way of example, it is preferred that this separation be larger than the same order of magnitude as the width of one of the guides, in order to reduce interaction therebetween. The distances of separation, however, are not critical. The guides A and B may be defined by dielectric materials embedded in a dielectric support having a lower index of refraction than the guides, as explained previously. The dielectric materials may be formed on a suitable substrate such as GaAs (not shown in FIG. 4). A suitable technique for forming the waveguides will be described below with reference to FIGS. 7A–7D.

The two guides A and B are closely spaced in the region 43. By way of example, the guides may be spaced by a distance of the same order of magnitude as the width of the guides. In the region 43 a piezoelectric film is deposited. Interdigital transducers 44 and 46 are formed on the piezoelectric film using conventional techniques. Means (not shown) are included for applying signals to the transducers in order to launch an acoustic surface wave in the region 43. As previously noted, the acoustic surface wave is effective to alter the propagation constant of the waveguides A and B.

Consider, for example, a signal initially propagating in guide A. In the absence of an acoustic wave, a signal coming in on guide A will propagate through the device in the two-guide "A" mode and leave, still in guide A, having undergone only a small coupling loss, as illustrated in FIGS. 2–3. However, in accordance with the present invention, acousto-optic interactions in a dielectric waveguide are utilized to produce mode conversion via momentum addition and subtraction to change the propagation constant. Thus, in FIG. 4, when acoustic waves are propagated through the device at $\Delta k = k_b' - k_a'$, mode conversion to the "B" mode will occur. The acousto-optic interaction in the signalcarrying guide will change the propagation constant to a value which the guide cannot support. However, because the new $k_b'$ can be supported by the adjacent empty guide, the coupling between the guides is greatly enhanced.

The switching of the signal from guide A to guide B is graphically illustrated in FIGS. 5A–5D. In FIG. 5A it may be seen that a signal is present only in guide A. In FIG. 5B the relative signal values present in guides A and B in the vicinity of transducer 44 are illustrated. Here the interaction of guide B with guide A changes the propagation constant of guide A to $k_a'$. Acousto-optic interactions resulting from acoustic surface waves generated by transducer 44 changes the propagation constant of guide A to a value which the guide cannot support. The acousto-optic interactions, however, produce a propagation constant $k_b'$ which is of a value which can be supported in the empty channel B. Thus, in the region between transducers 44 and 46, the signal initially propagated in channel A dissipates, while the previously empty channel B supports a signal. In other words, the signal is coupled from channel A to channel B as a result of the acousto-optic interactions. This is illustrated at FIG. 5C. The arrows referenced generally at 45 (FIG. 4) schematically illustrate coupling of the signal from guide A to guide B.

In FIG. 5D there is illustrated the signal distribution after coupling of the signal from guide A to guide B and separation of the two guides.

Coupling of a signal from one waveguide to an adjacent waveguide as a result of acousto-optic interactions is illustrated in FIG. 6, wherein a signal represented by the vector $\vec{k}_B$ initially propagates in guide B. This vector represents the fundamental mode of propagation of guide B. An acoustic surface wave produces acousto-optic interaction represented by the vector $\vec{\Delta k}$. Addition of the vector $\vec{\Delta k}$ to the vector $\vec{K}_B$ produces a signal that cannot be supported by guide B. However, the resultant signal matches the vector $\vec{k}_A$ which can be supported by adjacent channel A, and in effect the signal is coupled from guide B to guide A.

An alternate embodiment of a waveguide pair switch in accordance with the invention is illustrated in FIG. 7. In this embodiment two dielectric optical waveguides A and B are defined such that they are closely spaced (generally by a distance of the same order of magnitude as the width of one of the guides) in the region where switching is desired. The propagation vector $\vec{k}_{1a}$ of the fundamental mode $TE_{1a}$ of waveguide A does not match a propagation vector $\vec{k}_{1b}$ for any of the modes $TE_{1b}$ of waveguide B. However, a propagation vector $\vec{K}_{3a}$ corresponding to mode $TE_{3a}$ of the waveguide A does not match a propagation vector $\vec{K}_{1b}$ of waveguide B. Preferably, this vector is $K_{1b}$ which corresponds to the fundamental mode $TE_{1b}$ of waveguide B.

An acoustic surface wave transducer 47 is defined adjacent waveguide A at a location which will be traversed by a signal in guide A prior to the point where it is desired to switch the signal to waveguide B. The transducer may comprise an interdigital electrode pattern defined on a piezoelectric film (not shown) in a manner similar to that illustrated with respect to transducer 44 (FIG. 4). Transducer 47, however, launches a surface wave which interacts only with waveguide A. The acoustic surface wave launched by transducer 47 is defined to have a propagation vector $\vec{\Delta k}$ which equals $\vec{K}_{1a} - \vec{K}_{3a}$. Thus, if the acoustic surface wave is not launched, the signal will remain in waveguide A. However, responsive to an acoustic wave having a vector $\vec{\Delta K}$, the signal is switched from guide A to guide B. Therefore, switching is controlled by selective activation of transducer 45.

With reference now to FIGS. 8A–8D, a suitable technique for fabricating a waveguide for use in the asymmetric waveguide pair switch of the present invention will be described. It is to be understood, of course, that this specific example is by way of explanation only, and other materials and techniques may be used, as desired.

A first chalcogenide glass film 52 is formed on a suitable substrate 50 such as GaAs. The glass may be formed by well-known RF sputtering techniques. The glass is chosen to have a preselected index of refraction. As illustrated in FIG. 7B the glass film 52 is patterned by exposure of conventional photoresist 54 through a photomask. Next, back-sputtering of the glass film 52 around the photoresist mask 54, and removal of the hardened resist defines the waveguides 56 and 57. The structure at this stage of fabrication is illustrated in FIG. 8C. In the next step, a second chalcogenide glass 58 having a lower index of refraction than the glass 52 is RF sputtered around the waveguides 56 and 57. A piezoelectric film 60 is then defined on the surface of the glass layer 58 using convenient techniques. The film 60 is preferably formed only in the region where the two waveguides 56 and 57 are closely spaced. Finally, interdigital surface wave transducers (not shown) are defined in the piezoelectric layer 60 using suitable techniques well-known in the art.

While the present invention has been described in detail with respect to an illustrative embodiment, it is to be appreciated that various changes will be apparent to those skilled in the art without departing from the spirit or scope of the invention. For instance, while the acoustic wave is shown as being propagated longitudinally along the two-guide structure, transverse propagation may also be utilized.

What is claimed is:

1. An asymmetric waveguide pair switch comprising:

a substrate having a major surface;
   a first dielectric medium disposed on said major surface of said substrate, said first dielectric medium having a first preselected index of refraction and being patterned to define a pair of spaced apart waveguides extending across said major surface of said substrate;
   each of said pair of waveguides having a preselected propagation constant at which propagation of a signal therethrough can be supported;
   a second dielectric medium covering said waveguides and having a second index of refraction lower than said preselected index of refraction of said first dielectric medium defining said waveguides;
   a film of piezoelectric material disposed on said dielectric medium in overlying relation with respect to a portion of said pair of waveguides;
   surface wave transducer means defined on said film for generating an acoustic surface wave therein to interact with at least one of said pair of waveguides; and the propagation constant of the portion of said one waveguide operably associated with said surface wave transducer means being changeable to a value corresponding to the fundamental mode of propagation of the other waveguide in response to the interaction of said acoustic surface wave therewith such that a signal being propagated through the other waveguide may be switched to said at least one waveguide.

2. A waveguide pair switch as set forth in claim 1 wherein said waveguides are substantially parallel for a portion of their length and are there spaced apart by a distance of the same order of magnitude as the width of one of the guides, said waveguides being spaced apart a substantial distance in all regions except said substantially parallel portions.

3. A waveguide pair switch as set forth in claim 2 wherein said substrate is a semiconductor material.

4. A waveguide pair switch as set forth in claim 3 wherein said semiconductor is GaAs.

5. A waveguide pair switch as set forth in claim 4 wherein said first and second dielectric mediums comprise chalcogenide glass.

6. A waveguide pair switch as set forth in claim 1, wherein said surface wave transducer means is so constructed to interact with each of said pair of waveguides; and the propagation constant of the portion of the other waveguide operably associated with said surface wave transducer means being changeable to a value incapable of supporting signal propagation in response to the interaction of said acoustic surface wave therewith such that a signal being propagated through the other waveguide will be switched to said at least one waveguide.

7. A waveguide pair switch as set forth in claim 1, wherein said second dielectric medium comprises a dielectric layer disposed on said major surface of said substrate and in which said first dielectric medium defining said pair of spaced apart waveguides is embedded.

8. A waveguide pair switch as set forth in claim 7, wherein the portions of said pair of waveguides which are operably associated with said surface wave transducer means are disposed in close proximity to each other with a substantially smaller space therebetween as compared to the space existing between other portions of said pair of waveguides.

* * * * *